(12) United States Patent
Zalamea Bustillo et al.

(10) Patent No.: US 9,701,798 B2
(45) Date of Patent: Jul. 11, 2017

(54) MICROCAPILLARY FILMS AND FOAMS SUITABLE FOR CAPILLARY ACTION FLUID TRANSPORT

(71) Applicant: Dow Global Technololgies LLC, Midland, MI (US)

(72) Inventors: Luis G. Zalamea Bustillo, Richterswil (CH); Rudolf J. Koopmans, Einsiedeln (CH); Miguel A. Prieto Goubert, Richterswil (CH); Colmar Wocke, Rueti (CH)

(73) Assignee: Dow Global Technologies LLC, Midland, MI (US)

( * ) Notice: Subject to any disclaimer, the term of this patent is extended or adjusted under 35 U.S.C. 154(b) by 462 days.

(21) Appl. No.: 14/367,550

(22) PCT Filed: Dec. 21, 2012

(86) PCT No.: PCT/US2012/071116
§ 371 (c)(1),
(2) Date: Jun. 20, 2014

(87) PCT Pub. No.: WO2013/096714
PCT Pub. Date: Jun. 27, 2013

(65) Prior Publication Data
US 2015/0315345 A1    Nov. 5, 2015

Related U.S. Application Data

(60) Provisional application No. 61/578,932, filed on Dec. 22, 2011.

(51) Int. Cl.
*C08J 5/18* (2006.01)
*B32B 27/06* (2006.01)
(Continued)

(52) U.S. Cl.
CPC ............... *C08J 5/18* (2013.01); *B29C 44/50* (2013.01); *B29D 7/01* (2013.01); *B32B 3/20* (2013.01);
(Continued)

(58) Field of Classification Search
CPC ... C08J 5/18; C08J 9/35; C08J 2323/06; C08J 2323/02; C08J 2377/02; B32B 27/06;
(Continued)

(56) References Cited

U.S. PATENT DOCUMENTS

2006/0199930 A1    9/2006  Li Pi Shan et al.

FOREIGN PATENT DOCUMENTS

DE       153580       1/1982
DE      19842956      3/2000
(Continued)

OTHER PUBLICATIONS

Chinese Response to Office Action dated Mar. 12, 2016; from Chinese counterpart Application No. 201280063321.0.
(Continued)

*Primary Examiner* — Michael C Miggins
(74) *Attorney, Agent, or Firm* — Dinsmore & Shohl LLP

(57) ABSTRACT

The instant invention provides microcapillary films and/or foams suitable for capillary action fluid transport. The inventive microcapillary film and/or foam containing suitable for capillary action fluid transport according to the present invention has a first end and a second end, and comprises: (a) a matrix comprising a thermoplastic material, and (b) at least one or more channels disposed in parallel in said matrix from the first end to the second end of said microcapillary film and/or foam, wherein said one or more channels are at least 1 μm apart from each other, wherein each said one or more channels have a diameter in the range
(Continued)

of at least 1 μm; wherein said microcapillary film and/or foam has a thickness in the range of from 2 μm to 2000 μm.

9 Claims, 6 Drawing Sheets

(51) Int. Cl.
    *C08J 9/35*     (2006.01)
    *B29D 7/01*     (2006.01)
    *B32B 3/20*     (2006.01)
    *B32B 5/18*     (2006.01)
    *B29C 44/50*     (2006.01)
    *B29C 47/00*     (2006.01)
    *B29C 47/14*     (2006.01)
    *B29K 105/04*     (2006.01)
    *B29L 23/00*     (2006.01)
    *B29K 23/00*     (2006.01)
    *B29K 25/00*     (2006.01)
    *B29K 67/00*     (2006.01)
    *B29K 75/00*     (2006.01)
    *B29K 77/00*     (2006.01)

(52) U.S. Cl.
CPC ............... *B32B 5/18* (2013.01); *B32B 27/06* (2013.01); *C08J 9/35* (2013.01); *B29C 47/0021* (2013.01); *B29C 47/0028* (2013.01); *B29C 47/14* (2013.01); *B29K 2023/06* (2013.01); *B29K 2023/12* (2013.01); *B29K 2025/06* (2013.01); *B29K 2067/003* (2013.01); *B29K 2075/00* (2013.01); *B29K 2077/00* (2013.01); *B29K 2105/04* (2013.01); *B29K 2995/004* (2013.01); *B29K 2995/0068* (2013.01); *B29L 2023/22* (2013.01); *B32B 2597/00* (2013.01); *C08J 2323/02* (2013.01); *C08J 2323/06* (2013.01); *C08J 2377/02* (2013.01); *Y10T 428/1376* (2015.01); *Y10T 428/1397* (2015.01); *Y10T 428/24744* (2015.01)

(58) Field of Classification Search
CPC ......... B32B 3/20; B32B 5/18; B32B 2597/00; Y10T 428/1376; Y10T 428/1397; Y10T 428/24744; B29D 7/01; B29C 44/50; B29C 47/14; B29C 47/0028; B29C 47/0021; B29K 2105/04; B29K 2995/004; B29K 2995/0068; B29K 2023/06; B29K 2023/12; B29K 2025/06; B29K 2067/003; B29K 2075/00; B29K 2077/00
See application file for complete search history.

(56) References Cited

FOREIGN PATENT DOCUMENTS

| WO | WO 2005/056272 | 6/2005 |
|---|---|---|
| WO | 2005090427 | 9/2005 |
| WO | WO2008/044122 | 4/2008 |
| WO | 2011117579 A1 | 9/2011 |
| WO | 2012094315 | 7/2012 |
| WO | 2012094317 | 7/2012 |
| WO | WO2012/094315 | 7/2012 |
| WO | 2013009538 | 1/2013 |

OTHER PUBLICATIONS

Japanese Office Action dated Jul. 5, 2016; from Japanese counterpart Application No. 2014-548930.
Chinese Office Action dated Jun. 7, 2016; from Chinese counterpart Application No. 201280063391.0.
Chinese Response to Office Action dated Aug. 22, 2016; from Chinese counterpart Application No. 201280063391.0.
EP Response to Office Action dated Jan. 9, 2014; from EP counterpart Application No. 12818967.7.
PCT/US2012/071116 International Search Report and Written Opinion dated Apr. 4, 2013, 11 pages.
PCT/US2012/071116 International Preliminary Report on Patentability dated Jul. 3, 2014, 7 pages.
EPO Associate letter dated Aug. 4, 2014 for counterpart EPO Application No. 12818967.7 and EPO Office Action dated Aug. 1, 2014, 3 pages.
Chinese Office Action dated Dec. 10, 2015; from Chinese counterpart Application No. 201280063391.0.
Chinese Abstract First Page published Sep. 14, 2011,printed from https://depatsnet.com on Feb. 18, 2016, 1 pg.
Chinese Response to Office Action received Feb. 8, 2017; from counterpart Chinese Application No. 201280063391.0.
Japanese Office Action received Nov. 30, 2016; from counterpart Japanese Application No. 2014-548930.
Chinese Third Office Action received Nov. 25, 2016; from counterpart Chinese Application No. 201280063391.0.
Examination Report dated Mar. 30, 2017 pertaining to European Patent Application No. 12818967.7.

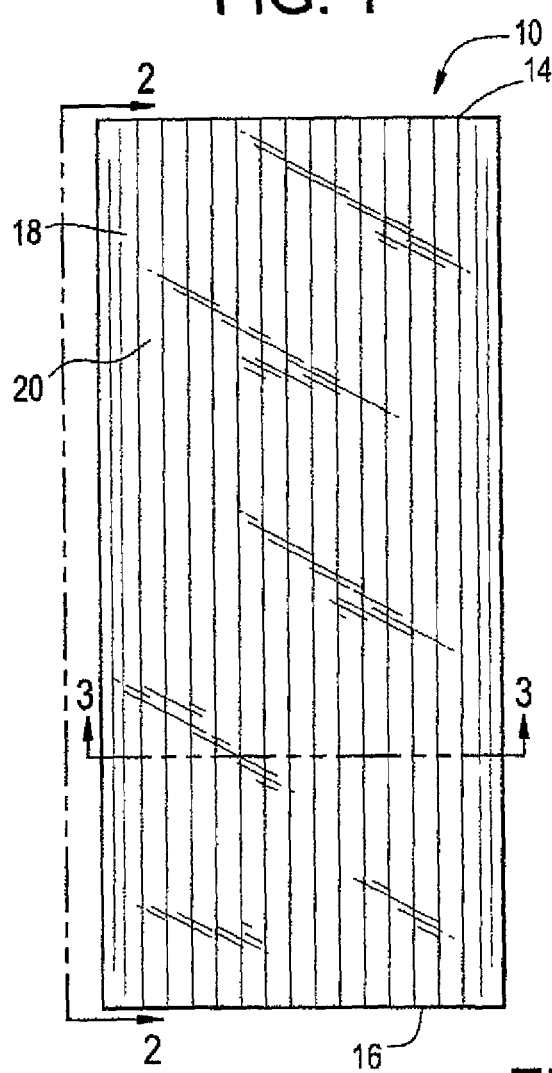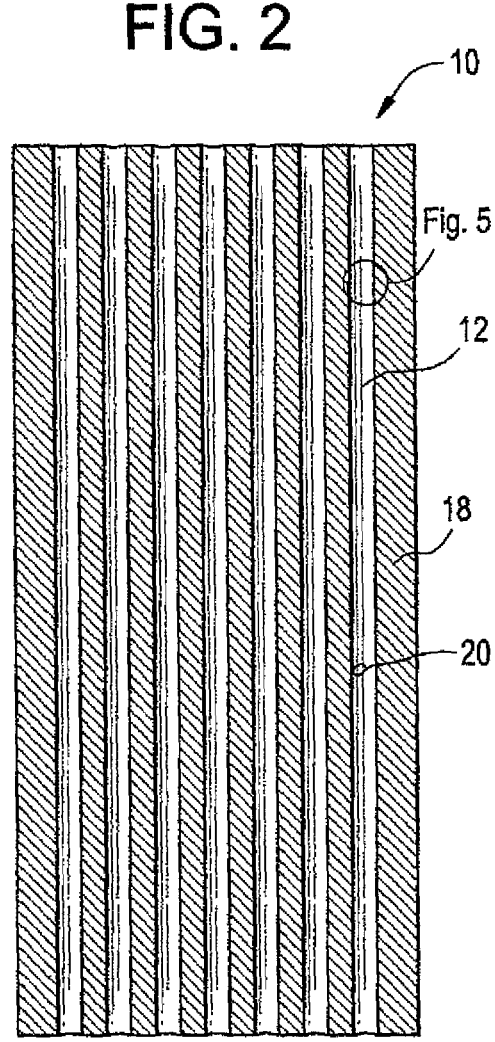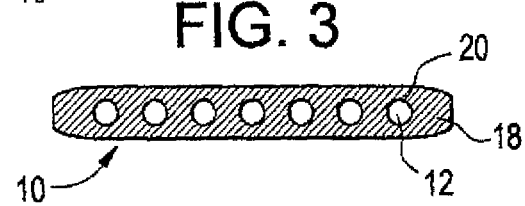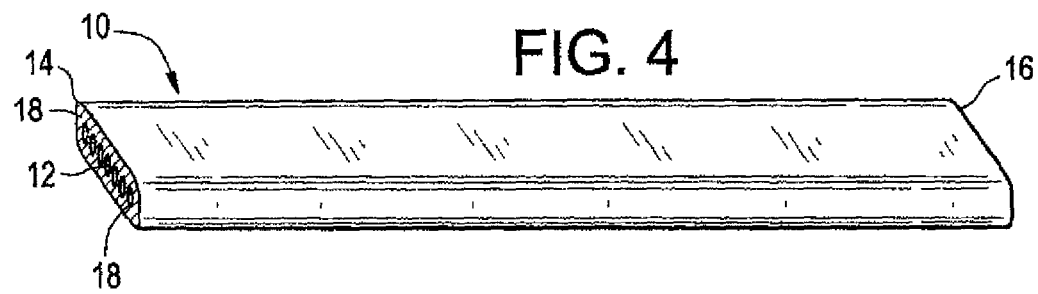

MICROCAPILLARY FILMS AND FOAMS SUITABLE FOR CAPILLARY ACTION FLUID TRANSPORT

FIELD OF INVENTION

The instant invention relates to microcapillary films and/or foams suitable for capillary action fluid transport.

BACKGROUND OF THE INVENTION

Capillary action, or capillarity, is the ability of a liquid to flow against gravity where liquid spontaneously rises in a narrow space such as between the hairs of a paint-brush, in a thin tube, in porous material such as paper, in some non-porous materials such as liquified carbon fiber, or in a cell. This effect can cause liquids to flow against the force of gravity, sun or any electro magnetic field affecting fluid flow. It occurs because of inter-molecular attractive forces between the transporting liquid and surrounding surface having a different surface energy. For the case of a tube, if the diameter of the tube is sufficiently small, then the combination of surface energy (which is caused by cohesion within the liquid) and force of adhesion between the liquid and tube wall act to lift the liquid.

While there are numerous methods for liquid transport based on capillary action, there is still a need for improved microcapillary films and/or foams suitable for capillary action fluid transport.

SUMMARY OF THE INVENTION

The instant invention provides microcapillary films and/or foams suitable for capillary action fluid transport. The inventive microcapillary film and/or foam containing suitable for capillary action fluid transport according to the present invention has a first end and a second end, and comprises: (a) a matrix comprising a thermoplastic material, and (b) at least one or more channels disposed in parallel in said matrix from the first end to the second end of said microcapillary film and/or foam, wherein said one or more channels are at least 1 µm apart from each other, wherein each said one or more channels have a diameter in the range of at least 1 µm; wherein said microcapillary film and/or foam has a thickness in the range of from 2 µm to 2000 µm.

In an alternative embodiment, the instant invention provides microcapillary films and/or foams suitable for capillary action fluid transport, in accordance with any of the preceding embodiments, except that the thermoplastic material is selected from the group consisting of polyolefin, e.g. polyethylene and polypropylene; polyamide, e.g. nylon 6; polyvinylidene chloride; polyvinylidene fluoride; polycarbonate; polystyrene; polyethylene terephthalate; polyurethane and/or polyester.

In an alternative embodiment, the instant invention provides microcapillary films and/or foams suitable for capillary action fluid transport, in accordance with any of the preceding embodiments, except that the one or more channels have a cross sectional shape selected from the group consisting of circular, rectangular, oval, star, diamond, triangular, square, the like, and combinations thereof.

In an alternative embodiment, the instant invention provides microcapillary films and/or foams suitable for capillary action fluid transport, in accordance with any of the preceding embodiments, except that the microcapillary channels and optionally the microcapillary film and/or foam surfaces are treated, e.g. surface treated, using a dielectric barrier discharge atmospheric or low pressure plasma including aerosoled functional molecules such as amines, hydroxyls, allyls, acrylics, fluorines, silicones, and the like to modify surface energy.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a top view of an inventive microcapillary film or foam suitable for capillary action fluid transport;

FIG. 2 is a longitudinal-sectional view of an inventive microcapillary film or foam suitable for capillary action fluid transport;

FIG. 3 is a cross-sectional views of an inventive microcapillary film or foam suitable for capillary action fluid transport;

FIG. 4 is an elevated view of an inventive microcapillary film or foam suitable for capillary action fluid transport;

DETAILED DESCRIPTION OF THE INVENTION

Figure 5:
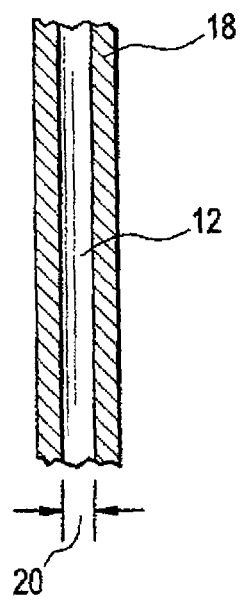
FIG. 5 is a segment of a longitudinal sectional view of the inventive microcapillary film or foam suitable for capillary action fluid transport, as shown in FIG. 2.
Figure 6:
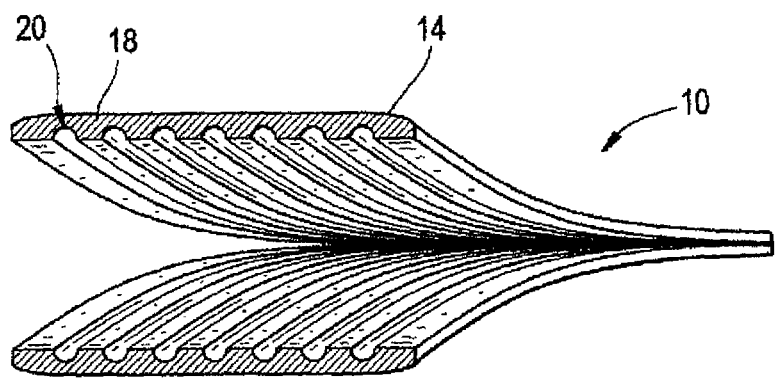
FIG. 6 is an exploded view of an inventive microcapillary film or foam suitable for capillary action fluid transport.

Referring to the drawings wherein like numerals indicate like elements, there is shown, in FIGS. 1-6, a first embodiment of a microcapillary film or foam (10) suitable for capillary action fluid transport.

The inventive microcapillary film or foam (10) suitable for capillary action fluid transport according to the present invention has a first end (14) and a second end (16), and comprises: (a) a matrix (18) comprising a thermoplastic material; (b) at least one or more channels (20) disposed in parallel in said matrix (18) from the first end (14) to the second end (16) of said microcapillary film or foam (10), wherein said one or more channels (20) are at least 1 µm apart from each other, and wherein each said one or more channels (20) have a diameter in the range of at least 1 µm; wherein said microcapillary film (10) has a thickness in the range of from 2 µm to 2000 µm.

The microcapillary film or foam (10) suitable for capillary action fluid transport may have a thickness in the range of from 2 µm to 2000 µm; for example, microcapillary film or foam (10) suitable for capillary action fluid transport may have a thickness in the range of from 10 to 2000 µm; or in the alternative, from 100 to 1000 µm; or in the alternative, from 200 to 800 µm; or in the alternative, from 200 to 600 µm; or in the alternative, from 300 to 1000 µm; or in the alternative, from 300 to 900 µm; or in the alternative, from 300 to 700 µm. The film thickness to microcapillary diameter ratio is in the range of from 2:1 to 2000:1. The term "microcapillary film," as used herein refers to films as well as tapes, and may be formed into the shape of a pipe, rod or profile.

The microcapillary film or foam (10) suitable for capillary action fluid transport may comprise at least 10 percent by volume of the matrix (18), based on the total volume of the microcapillary film or foam (10) suitable for capillary action fluid transport; for example, the microcapillary film or foam (10) suitable for capillary action fluid transport may comprise from 10 to 80 percent by volume of the matrix (18), based on the total volume of the microcapillary film or foam (10) suitable for capillary action fluid transport; or in the alternative, from 20 to 80 percent by volume of the matrix (18), based on the total volume of the microcapillary film or foam (10) suitable for capillary action fluid transport; or in the alternative, from 30 to 80 percent by volume of the matrix (18), based on the total volume of the microcapillary film or foam (10) suitable for capillary action fluid transport.

The microcapillary film or foam (10) suitable for capillary action fluid transport may comprise from 20 to 90 percent by volume of voidage, based on the total volume of the microcapillary film or foam (10) suitable for capillary action fluid transport); for example, the microcapillary film or foam (10) suitable for capillary action fluid transport may comprise from 20 to 80 percent by volume of voidage, based on the total volume of the microcapillary film or foam (10) suitable for capillary action fluid transport; or in the alternative, from 20 to 70 percent by volume of voidage, based on the total volume of the microcapillary film or foam (10) suitable for capillary action fluid transport; or in the alternative, from 30 to 60 percent by volume of voidage, based on the total volume of the microcapillary film or foam (10) suitable for capillary action fluid transport.

The inventive microcapillary film or foam (10) has a first end (14) and a second end (16). At least one or more channels (20) are disposed in parallel in the matrix (18) from the first end (14) to the second end (16). The one or more channels (20) are at least 1 µm apart from each other. The one or more channels (20) have a diameter in the range of at least 1 µm; for example, from 1 µm to 1998 µm; or in the alternative, from 5 to 990 µm; or in the alternative, from 5 to 890 µm; or in the alternative, from 5 to 790 µm; or in the alternative, from 5 to 690 µm or in the alternative, from 5 to 590 µm. The one or more channels (20) may have a cross-sectional shape selected from the group consisting of circular, rectangular, oval, star, diamond, triangular, square, the like, and combinations thereof. The one or more channels (20) may further include one or more seals at the first end (14), the second end (16), therebetween the first point (14) and the second end (16), and/or combinations thereof.

The microcapillary channels, i.e. (inside of the microcapillaries), and optionally the microcapillary film or foam (10) surface may further be modified by surface treatment of the microcapillary channels, i.e. (inside of the microcapillaries) or the surface treatment of the film and/or foam surface, or combinations thereof via, for example, plasma surface treatment, and/or chemical grafting surface treatment. In one embodiment, the microcapillary channels, i.e. (inside of the microcapillaries), and optionally the microcapillary film or foam (10) surface are treated in a dielectric barrier discharge atmospheric or low pressure plasma including aerosoled functional molecules such as amines, hydroxyls, allyls, acrylics, fluorines, silicones, and the like to modify surface energy. The surface treatment may be for a period in the range of from 1 second to one hour, for example, from 1 to 60 seconds. Surface treatment can be achieved via any known methods.

The matrix (18) comprises one or more thermoplastic materials. Such thermoplastic materials include, but are not limited to, polyolefin, e.g. polyethylene and polypropylene; polyamide, e.g. nylon 6; polyvinylidene chloride; polyvinylidene fluoride; polycarbonate; polystyrene; polyethylene terephthalate; polyester, and polyurethanes. The matrix (18) may be reinforced via, for example, glass or carbon fibers and/or any other mineral fillers such talc or calcium carbonate. Exemplary fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

Examples of thermoplastic materials include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polyurethane; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

In selected embodiments, thermoplastic material may, for example, comprise one or more polyolefins selected from the group consisting of ethylene-alpha olefin copolymers, propylene-alpha olefin copolymers, and olefin block copolymers. In particular, in select embodiments, the thermoplastic material may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers; high density polyethylene (HDPE); heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers; and high pressure, free radical polymerized ethylene polymers and copolymers such as low density polyethylene (LDPE) or ethylene vinyl acetate polymers (EVA).

In one embodiment, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the thermoplastic material may, for example, be a semi-crystalline polymer and may have a melting point of less than 110° C. In another embodiment, the melting point may be from 25 to 100° C. In another embodiment, the melting point may be between 40 and 85° C.

In one particular embodiment, the thermoplastic material is a propylene/α-olefin interpolymer composition comprising a propylene/alpha-olefin copolymer, and optionally one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 30 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082599, each of which is incorporated herein by reference.

In certain other embodiments, the thermoplastic material, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers and the test methods for measuring those properties listed below for such polymers, may be used as the thermoplastic material. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In one embodiment, matrix (18) may further comprise a blowing agent thereby facilitating the formation a foam material. In one embodiment, the matrix may be a foam, for example a closed cell foam. In another embodiment, matrix (18) may further comprise one or more fillers thereby facilitating the formation a microporous matrix, for example, via orientation, e.g. biaxial orientation, or cavitation, e.g. uniaxial or biaxial orientation, or leaching, i.e. dissolving the fillers. Such fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

Figure 7A:
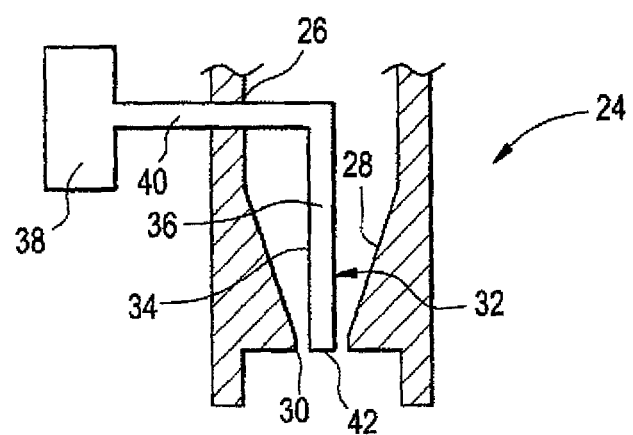
FIGS. 7a-b are schematic illustration of a microcapillary die.
Figure 7B:
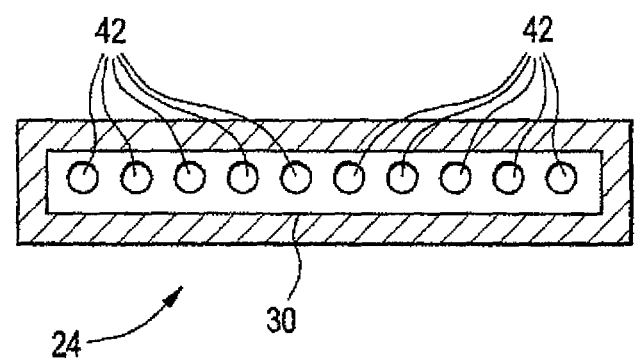

In production, the extrusion apparatus comprises a screw extruder driven by a motor. Thermoplastic material is melted and conveyed to a die (24), as shown in FIGS. 7a and 7b. The molten/semi-molten thermoplastic material passes through die (24), as shown in FIGS. 7a and 7b, and is formed into the desired shape and cross section. Referring to FIGS. 7a and 7b, die (24) includes an entry portion (26), a convergent portion (28), and an orifice (30), which has a predetermined shape. The molten/semi-molten thermoplastic polymer enters entry portion (26) of the die (24), and is gradually shaped by the convergent portion (28) until the melt exits the orifice (30). The die (24) further includes injectors (32). Each injector (32) has a body portion (34) having a conduit (36) therein which is fluidly connected to one or more gases, e.g. air or nitrogen, source (38) by means of second conduit (40) passing through the walls of die (24) around which the molten/semi-molten thermoplastic material must flow to pass the orifice (30). The injector (30) further includes an outlet (42). The injector (32) is arranged such that the outlet (42) is located within the orifice (30). As the molten/semi-molten thermoplastic polymer exits the die orifice (30), one or more gases, e.g. air or nitrogen (12) is injected into the molten/semi-molten thermoplastic material thereby forming microcapillaries films and/or foams suitable for capillary action fluid transport.

The microcapillary films or foams suitable for capillary action fluid transport according to the present invention may be formed, and then subjected to plasma treatment to modify the surface, e.g. forming a plasma coating (12). The plasma coating (12), as used herein, can be continuous, discontinuous, and/or integrated part of the surface. In the alternative, plasma gas such as a nobel gas and/or nitrogen may be injected into the molten/semi-molten thermoplastic material as part of the process for making the microcapillary films or foams suitable for capillary action fluid transport and subsequently modifying microcapillaries surface by inducing a plasma form the inserted gas or gas mixture in the microcapillaries via for example a dielectric barrier discharge technology and. forming in the process a plasma coating and/or surface energy modification (12).

The microcapillary films or foams suitable for capillary action fluid transport according to the present invention may be used in fluid transportation such as micro-irrigation. The microcapillary films or foams suitable for capillary action fluid transport according to the present invention may be formed into capillary tubes. Capillary tubes are small irrigation distribution tubes (drip tubes) that are assembled into drip stakes to make a drip irrigation system for use in modern glasshouse horticulture. These capillary tubes are available in various sizes and lengths, and with the adjustment in working pressure, the water supply delivery volume can be achieved.

One or more inventive microcapillary films and/forms suitable for capillary action fluid transport may be combined to form one or more layers in a multilayer structure, for example, a laminated multilayer structure or a coextruded multilayer structure. The microcapillary films or foams suitable for capillary action fluid transport may comprise one or more parallel rows of microcapillaries (channels as shown in FIG. 3). Channels (20) (microcapillaries) may be disposed any where in matrix (10), as shown in FIGS. 3.

EXAMPLES

The following examples illustrate the present invention but are not intended to limit the scope of the invention.

PlasmaZone® developed by VITO—Flemish Institute for Technological Research in Belgium was used as plasma equipment. ThePlasmaZone® (1 electrode of 40 cm width) operates according to the following specifications:

TABLE 1

| | |
|---|---|
| Power | 10-1000 W |
| Voltage | 1-100 kV |
| Frequency | 1-100 kHz |
| Plasma gas | nitrogen, air, oxygen, carbon dioxide, hydrogen, helium, argon, . . . and any mixtures thereof |
| Gas consumption | 5-50 l/min |
| Chemical precursors (liquid or gaseous) | optional: hydrocarbons, organic acids, siloxanes |
| Precursor consumption | 1-20 ml/min |
| Homogeneous plasma area | variable, typical 8 to 20 cm |
| Inter electrode distance | 0.5-25 mm |
| Working temperature | 25-250° C. |
| Typical deposition rate for coatings | 1-100 nm/sec |
| Inter electrode distance | 0.5-25 mm |

It consists of two electrodes from which the upper one is connected to high voltage and the lower one is grounded. A dielectric barrier discharge is generated between both electrodes. In order to surface treat the inner side of the capillary tapes, a specific gas mixture was blown in the capillaries. The capillary tape was then disposed in the plasma zone for a fixed time, and thereby forming a plasma chemically modified surface or coating on the surfaces of the inner side of the capillaries.

Figure 8:
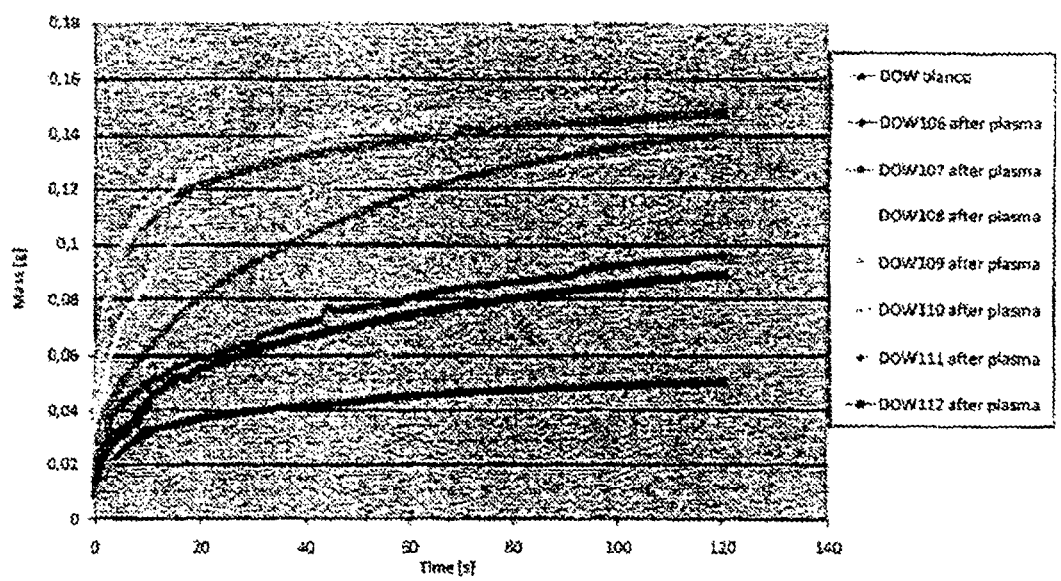
FIG. 8 is a graph illustrating the results of tensiometer evaluation of the samples DOW101-DOW112.

12 experimental conditions designated as DOW101-DOW112 in Table 2 were evaluated, and results are shown in FIG. 8. DOW101-DOW110 were samples with the surface, inside of the microcapillaries, treated via gaseous precursors. DOW111-DOW112 were samples with the surface inside of the microcapillaries treated via a liquid precursor that was atomized to a very fine aerosol.

TABLE 2

| Sample No. | Functionality | Plasma Gas Type | Treatment Time (s) |
|---|---|---|---|
| DOW101 | none | He | 5 |
| DOW102 | Amine | He/N$_2$ | 5 |
| DOW103 | Amine | He/N$_2$/H$_2$ | 5 |
| DOW104 | Amine | He/NH$_3$ | 5 |
| DOW105 | Amine | He/N$_2$/H$_2$/NH$_3$ | 20 |
| DOW106 | Amine | He/N$_2$/H$_2$/NH$_3$ | 5 |
| DOW107 | Amine | He/N$_2$/H$_2$/NH$_3$ | 20 |
| DOW108 | Amine | He/N$_2$/H$_2$/NH$_3$ | 10 |
| DOW109 | Amine | He/N$_2$/H$_2$/NH$_3$ | 20 |
| DOW110 | Hydroxyl | He/N$_2$/H$_2$ | 20 |
| DOW111 | Hydroxyl | He | 20 |
| DOW112 | | He | 5 |

The gas mixture's main component was nitrogen with small amounts of He (<1% vol) as plasma initiating gas and depending on the desired functionality up to 5% vol of Hydrogen and/or, Ammonia.

Figure 9:
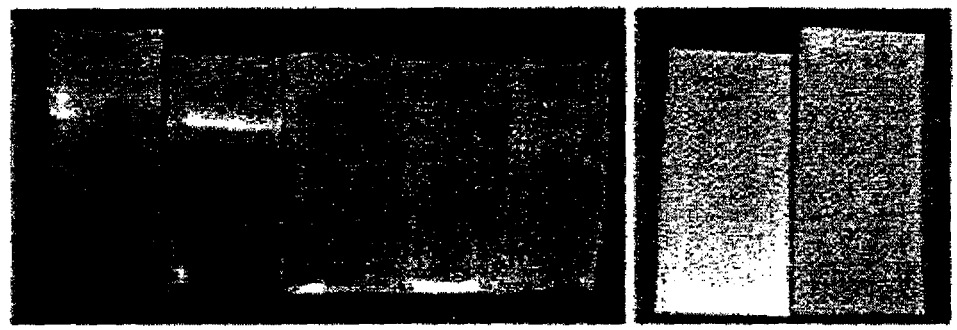
FIG. 9 is a photograph of samples after tensiometer evaluation.

A tensiometer test was used to evaluate the effect of the different experimental conditions on the hydrophilic behavior of the inner side of the capillaries. A LLDPE DOWLEX™ 2045G sample of about 7 cm height, 32.5 cm wide and a thickness of 790 µm with 42 microcapillaries with each an average diameter of 400 µm was put into a bath filled with de-ionized water at room temperature. The samples were immersed for 2 cm and the uptake of water in weight was measured continuously. After 2 minutes immersion, the samples were removed from the water and the uptake of water was inspected visually, and the results are shown in FIG. 9.

Figure 10:
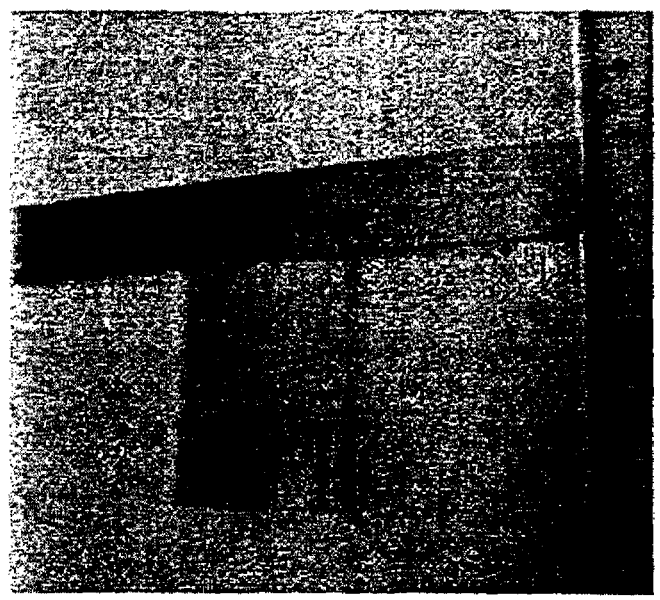
FIG. 10 is another photograph of a sample after tensiometer evaluation.

Referring to FIG. 10, hydrocarbon, non polar fluids having surface tensions similar that of polyolefins resins capillary effects are achieved with or without treatment with options to induce capillary rise between 3-4 m provided the diameter is about 5-10 μm and the surface tension of the tubes equals that of the liquid. LLDPE DOWLEX™ 2045G untreated prototype samples show capillary rise with n-hexane (18.43 mN/m@ 20° C.). For a 400 μm capillary a rise of about 35 mm is observed, while for a 145 μm capillary a rise of about 80 mm is noted.

The present invention may be embodied in other forms without departing from the spirit and the essential attributes thereof, and, accordingly, reference should be made to the appended claims, rather than to the foregoing specification, as indicating the scope of the invention.

We claim:

1. A microcapillary film or foam having a first end and a second end, wherein said film or foam comprises:
   (a) a matrix comprising a thermoplastic material; and
   (b) one or more channels disposed in parallel in said matrix from the first end to the second end of said film or foam, wherein said one or more channels are at least 1 μm apart from each other, wherein said one or more channels are surface treated, and wherein each said one or more channels have a diameter in the range of at least 1 μm;
wherein said film or foam has a thickness in the range of from 2 μm to 2000 μm.

2. The microcapillary film or foam of claim 1, wherein said one or more channels have a cross-sectional shape selected from the group consisting of circular, rectangular, oval, star, diamond, triangular, square, and combinations thereof.

3. The microcapillary film or foam of claim 1, wherein the microcapillary film or foam surface are surface treated.

4. The microcapillary film or foam of claim 1, wherein said thermoplastic material is selected from the group consisting of polyolefin, polyamide; polyvinylidene chloride; polyvinylidene fluoride; polyurethane; polycarbonate; polystyrene; polyethylene vinylalcohol (PVOH), polyvinyl chloride, polylactic acid (PLA) and polyethylene terephthalate.

5. The microcapillary film or foam of claim 4, wherein said polyolefin is polyethylene or polypropylene.

6. The microcapillary film or foam of claim 4, wherein said polyamide is nylon 6.

7. A multilayer structure comprising the microcapillary film or foam of claim 1.

8. A pipe or profile comprising the microcapillary film or foam of claim 1.

9. An article comprising the microcapillary film or foam of claim 1.

* * * * *